United States Patent [19]

Tanaka et al.

[11] Patent Number: 5,027,431
[45] Date of Patent: Jun. 25, 1991

[54] RADIO COMMUNICATION APPARATUS

[75] Inventors: Takakazu Tanaka; Yuji Hirai, both of Fukuoka, Japan

[73] Assignee: Matsushita Electric Industrial Co., Ltd., Japan

[21] Appl. No.: 316,061

[22] Filed: Feb. 27, 1989

[30] Foreign Application Priority Data

Mar. 4, 1988 [JP] Japan .................... 63-51901

[51] Int. Cl.$^5$ .............................................. H04B 7/00
[52] U.S. Cl. ...................................... 455/214; 455/33; 455/161; 455/166
[58] Field of Search ............... 455/214, 166, 33, 34, 455/35, 78, 161, 164, 165; 379/58, 59

[56] References Cited

U.S. PATENT DOCUMENTS

| | | | |
|---|---|---|---|
| 4,009,442 | 2/1977 | von Bromssen | 455/166 |
| 4,380,826 | 4/1983 | Usugi | 455/165 |
| 4,597,104 | 6/1986 | Ohki | 455/166 |
| 4,679,225 | 7/1987 | Higashiyama | 455/32 |

FOREIGN PATENT DOCUMENTS 2703767 8/1978 Fed. Rep. of Germany ........ 455/32

*Primary Examiner*—Reinhard J. Eisenzopf
*Assistant Examiner*—Kinfe-Michael Negash
*Attorney, Agent, or Firm*—Lowe, Price, LeBlanc & Becker

[57] ABSTRACT

A radio communication apparatus includes a device for sequentially discriminating whether or not different frequency channels are open or occupied and generating channel-condition signals representative thereof during each of cycles of a channel scan. The channel-condition signals correspond to the channels respectively. A device holds the channel-condition signals and thereafter outputs the channel-condition signals. A device detects a variation between a current channel-condition signal and a preceding channel-condition signal in respect of each of the channels. The current channel-condition signal is currently generated by the discriminating device. The preceding channel-condition signal is outputted from the holding device. A device detects whether or not a given identification signal is present in the channel where the detected variation occurs.

3 Claims, 3 Drawing Sheets

RADIO COMMUNICATION APPARATUS

BACKGROUND OF THE INVENTION

1. Field of the Invention

This invention relates to a radio communication apparatus such as a radio communication transceiver of the multi channel access (MCA) type.

2. Description of the Prior Art

Some communication stations use conventional MCA-type radio communication transceivers which automatically find an open or unoccupied channel from a plurality of channels and which perform communication via the open channel. In cases where such a MCA-type transceiver of a station is required to transmit an information signal, a transmitter side of the transceiver scans channels to find an open channel. When the open channel is found, the transmitter side transmits the information signal via the open channel. In cases where the station is in a stand-by mode, a receiver side of the transceiver scans the channels to detect a related identification (ID) signal.

During the stand-by channel scan, the receiver side checks whether or not a channel is occupied by a signal having an electric field stronger than a given level. When the channel is unoccupied, the scanning process advances to a subsequent channel and the receiver side performs a similar check with respect to the subsequent channel. Such checks are reiterated sequentially for respective channels until an occupied channel is found. In the case where an occupied channel is found, the receiver side determines whether or not a related ID signal is present in the received signal. When the related ID signal is present, the associated transmitter side is activated to transmit an answer signal via the channel. When the related ID signal is absent, the scanning process advances to a subsequent channel and the receiver side performs the previously-mentioned check with respect to the subsequent channel.

In cases where the number of the channels is large, such a conventional stand-by channel scan tends to take a considerable length of time to find a related identification signal.

SUMMARY OF THE INVENTION

It is an object of this invention to provide a radio communication apparatus which can quickly find a related identification signal in a stand-by channel scan.

A radio communication apparatus of this invention includes a device for sequentially discriminating whether or not different frequency channels are open or occupied and generating channel-condition signals representative thereof during each of cycles of a channel scan. The channel-condition signals correspond to the channels respectively. A device holds the channel-condition signals and thereafter outputs the channel-condition signals. A device detects a variation between a current channel-condition signal and a preceding channel-condition signal in respect of each of the channels. The current channel-condition signal is currently generated by the discriminating device. The preceding channel-condition signal is outputted from the holding device. A device detects whether or not a given identification signal is present in the channel where the detected variation occurs.

DESCRIPTION OF THE PREFERRED EMBODIMENT

Figure 1:
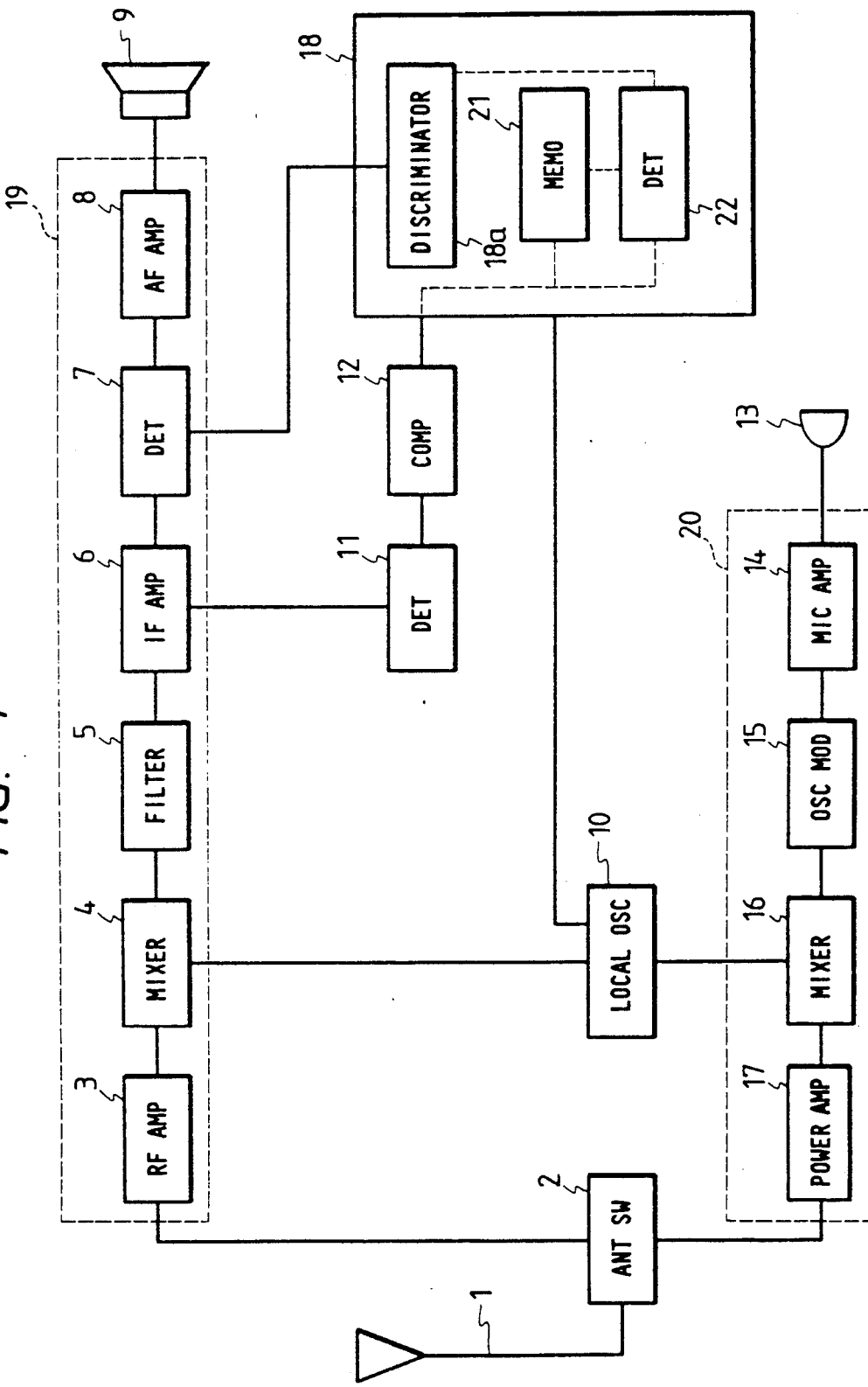
FIG. 1 is a block diagram of a radio communication apparatus according to an embodiment of this invention.

With reference to FIG. 1, a radio communication apparatus or transceiver includes an antenna 1 connected to an antenna switch or relay 2. During a reception mode or a stand-by mode of operation of the transceiver, a radio frequency (RF) signal induced in the antenna 1 is transmitted to an RF amplifier 3 via the antenna switch 2. A mixer 4 converts an RF output signal from the RF amplifier 2 into a corresponding intermediate frequency (IF) signal by mixing the RF signal and an output signal from a local oscillator 10. The frequency of the output signal from the local oscillator 10 is changeable among a set of equally-separated predetermined frequencies corresponding to respective communication frequency channels. The frequency of the output signal from the local oscillator 10 is changed by an output signal from a control circuit 18. The IF signal is transmsitted from the mixer 4 to a demodulator or detector 7 via a band pass filter 5 and an IF amplifier 6. The detector 7 derives an audio frequency (AF) signal from the IF signal. The AF signal is applied to a loudspeaker 9 via an AF amplifier 8. The devices 3-8 constitute a receiver section 19 of the transceiver.

A detector 11 connected to the IF amplifier 6 detects the strength of the IF signal, that is, the strength of the corresponding received RF signal. The detector 11 outputs a strength signal whose voltage depends on the strength of the received RF signal, the output strength signal being fed to a comparator 12. The device 12 compares the strength signal with a reference voltage representing a preset reference signal strength. The comparator 12 generates a judgment signal which represents whether or not the strength of the received RF signal exceeds the reference strength. The judgment signal is fed to the control circuit 18. Specifically, the reference signal strength is preferably chosen to allow the comparator 12 to discriminate whether the received channel is open or occupied. Accordingly, the judgment signal generally represents whether or not the received channel is open.

During a transmission mode of operation of the receiver, an AF signal is fed from a microphone 13 to a device 15 via a microphone amplifier 14. The device 15 includes an oscillator and a modulator. In the device 15, the oscillator generates a given-frequency signal which is modulated by the modulator in accordace with the AF signal. The device 15 outputs an IF signal which equals the modulated signal. A mixer 16 converts the IF output signal from the device 15 into a corresponding RF signal by mixing the IF signal and an output signal from the local oscillator 10. As described previously, the frequency of the output signal from the local oscillator 10 is changeable among a set of equally-separated predetermined frequencies corresponding to respective communication frequency channels. The frequency of the output signal from the local oscillator 10 is changed by the output signal from the control circuit 18. The RF output signal from the mixer 16 is fed to the antenna 1 via an RF power amplifier 17 and the antenna switch 2. The devices 14-17 constitute a transmitter section 20 of the transceiver.

The control circuit 18 preferably includes a microcomputer having a combination of an input port, an output port, a central processing unit (CPU), a read only memory (ROM), and a random access memory (RAM).

The control circuit 18 includes a discriminator 18a receiving an output signal from the detector 7. The discriminator 18a determines whether or not an ID signal calling a station related to this transceiver is present in the received signal. A main part of the discriminator 18a is formed by the CPU. The control circuit 18 also includes a memory 21 which is composed of the RAM. The memory 21 holds data which are derived from the output signal of the comparator 12 during one cycle of the channel scan in the stand-by mode of operation of the transceiver. The control circuit 18 further includes a variation detector 22. In the stand-by mode of operation of the transceiver, the variation detector 22 senses a data variation by comparing first data and second data, the first data being derived from the output signal of the comparator 12 during a current cycle of the channel scan, the second data being derived from the output signal of the comparator 12 during the preceding cycle of the channel scan and being fed from the memory 21. The variation detector 22 is formed by the CPU.

Figures 2, 3:
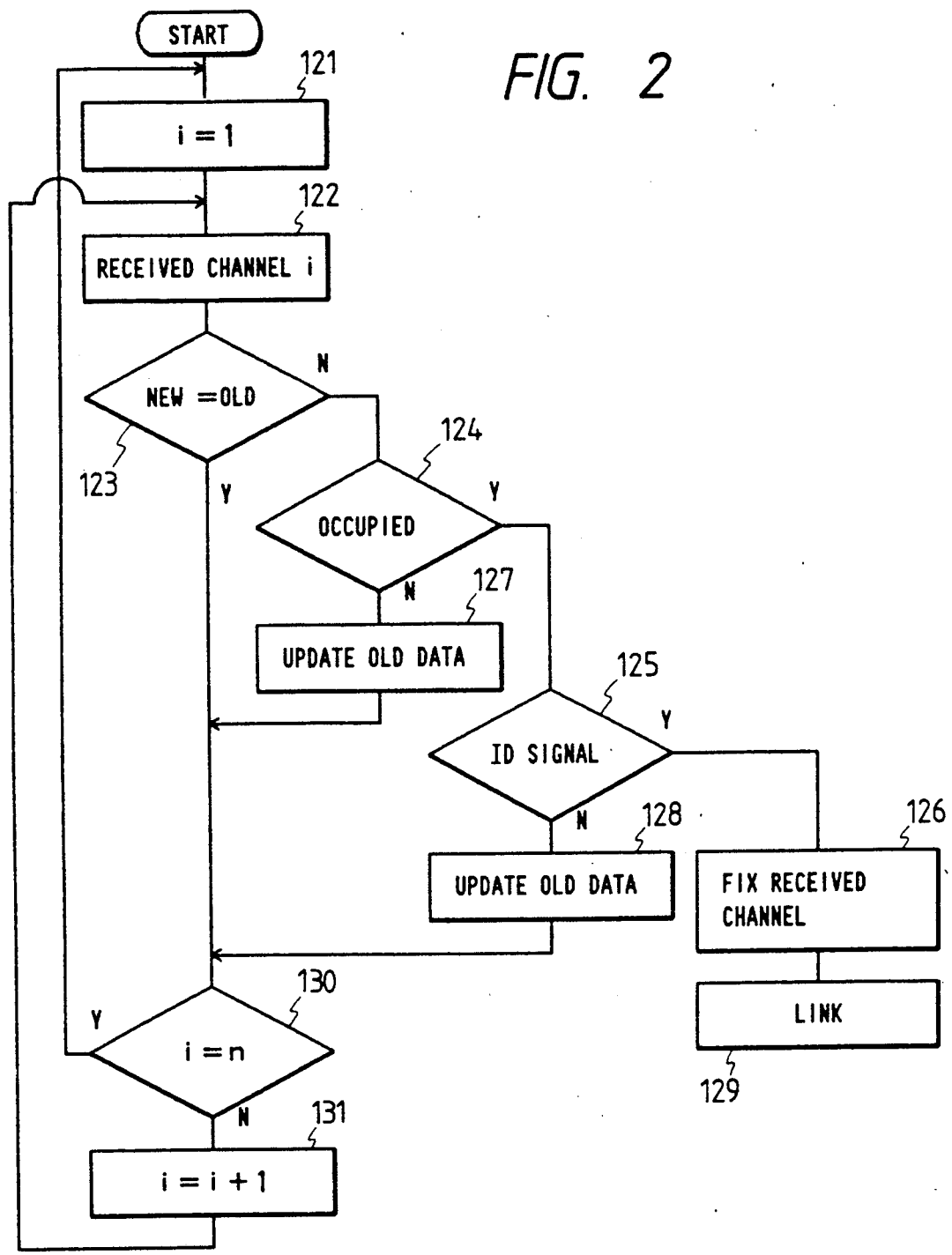
FIG. 2 is a flowchart of part of a program operating the control circuit of FIG. 1.
FIG. 3 is a diagram showing an example of conditions of channels.

The control circuit 18 operates in accordance with a program stored in the ROM. FIG. 2 is a flowchart of the part of the program which corresponds to the stand-by mode of operation of the transceiver. The stand-by mode of operation of the transceiver will be described in detail hereinafter with reference to FIG. 2.

When a power supply switch (not shown) of the transceiver is turned to an ON position, the program starts and advances to a step 121 which sets the variable "i" to "1". The channels are numbered from "1" to "n" and are identified by these numbers. The variable "i" represents a selected or received channel. After the step 121, the program advances to a step 122.

The step 122 controls the local oscillator 10 in accordance with the value "i" to select the channel whose identification number is equal to the value "i". The selected channel is monitored by the receiver section 19 of the transceiver.

A step 123 following the step 122 derives new data Di(new) from the output signal of the comparator 12. The new data Di(new) relates to the selected channel "i". Then, the step 123 compares the new data Di(new) and old data Di(old). The old data Di(old) is derived from the output signal of the comparator 12 during the preceding cycle of the channel scan. The old data Di(old) relates to the selected channel "i". The step 123 fetches the old data Di(old) from the memory 21. It should be noted that the old data Dl(old)-Dn(old) are initialized to given values when the first cycle of the channel scan is started. When the new data Di(new) equals the old data Di(old), the program advances to a step 130. When the new data, Di(new) differs from the old data Di(old), the program advances to a step 124.

The step 124 checks the output signal from the comparator 12. When the output signal from the comparator 12 represents that the strength of the received RF signal exceeds the reference strength, that is, when the output signal from the comparator 12 represents that the present channel is occupied, the program advances to a step 125. When the output signal from the comparator 12 represents that the strength of the received RF signal does not exceed the reference strength, that is, when the output signal from the comparator 12 represents that the present channel is open, the program advances to a step 127.

The step 127 updates the old data Di(old) by setting the old data Di(old) equal to the new data Di(new). After the step 127, the program advances to the step 130.

The step 125 checks the output signal from the detector 7 and discriminates whether or not an ID signal calling a station related to this transceiver is present in the received signal. When the ID signal is present in the received signal, the program advances to a step 126. When the ID signal is absent from the received signal, the program advances to a step 128.

The step 128 updates the old data Di(old) by setting the old data Di(old) equal to the new data Di(new). After the step 128, the program advances to the step 130.

The step 126 controls the local oscillator 10 so that the frequency of the output signal from the local oscillator 10 is fixed to the current frequency which corresponds to the current channel "i".

A step 129 following the step 122 activates the transmitter section 20 to transmit an answer signal via the current channel "i" in a known way. The step 129 establishes a communication link in a conventional manner.

The step 130 compares the value "i" with a given number "n" which equals the total number of the channels. When the value "i" differs from the given number "n", the program advances to a step 131. When the value "i" equals the given number "n", the program returns to the step 121.

The step 131 increments the channel number "i" by "1" by executing the statement "i=i+1". After the step 131, the program returns to the step 122.

In cases where the ID signal which calls the station related to this transceiver is absent from any of the channels, the channels are scanned sequentially. After one cycle of the channel scan is completed, the subsequent cycle of the channel scan is started. In one cycle of the channel scan, each channel change is performed in response to the increment of the channel number "i" which is executed by the step 131. When the step 130 detects that the channel number "i" reaches the given number "n", that is, when the step 130 detects that one cycle of the channel scan is completed, the step 121 resets the channel number "i" to "1" and thus the subsequent cycle of the channel scan is started.

In cases where the ID signal which calls the station related to this transceiver is absent from any of the channels, during one cycle of the channel scan, the new data Dl(new)-Dn(new) are compared with the respective old data Dl(old)-Dn(old) by the step 123. When the step 123 detects that the new data differs from the corresponding old data, that is, when the step 123 detects a change of the data, the step 127 or 128 updates the old data by the new data. When the step 123 detects that the new data equals the corresponding old data, that is, when the step 123 detects that the data is unchanged, the program jumps from the step 123 to the step 130 so that the old data remains unchanged. This program jump shortens the time spent in one cycle of the channel scan.

During the channel scan, when the ID signal which calls the station related to this transceiver is detected by the step 125, the steps 126 and 129 establish the communication link via the channel where the ID signal is present.

As understood from the previous description, in respect of only a channel or channels subjected to a data change, the step 124 is executed. The step 124 discriminates whether or not the data change corresponds to a change of the present channel from an open state to an occupied state. Only when the data change corresponds to the change of the present channel from the open state to the occupied state, the step 125 is executed which discriminates the presence or absence of a related ID signal in or from the present channel. In this way, the numbers of times of execution of the steps 124 and 125 are minimized to shorten the period of one cycle of the channel scan. Also, the numbers of times of execution of the data-updating steps 127 and 128 are minimized to shorten the period of one cycle of the channel scan.

A further description will be made hereinafter on the stand-by mode of operation of the transceiver under conditions of FIG. 3 where white circles denote open channels and hatched circles denote occupied channels.

As shown in FIG. 3, during "m−1"-th cycle of the channel scan, 4-channel, 6-channel, 8-channel, and 10-channel are occupied but other channels are open. It is assumed that the ID signal which calls the station related to this transceiver is absent from any of 4-channel, 6-channel, 8-channel, and 10-channel.

During "m"-th cycle of the channel scan, the changes of data in 4-channel, 9-channel, and 10-channel are detected by the step 123, and therefore the program advances from the step 123 to the step 124. The step 124 detects the type of the data change. When the data changes from a channel-occupied state to a channel-open state as in 4-channel and 10-channel, the program advances from the step 124 to the step 127 which updates the old data of the present channel. When the data changes from the channel-open state to the channel-occupied state as in 9-channel, the program advances from the step 124 to the step 125 which discriminates the presence or absence of the related ID signal in or from the present channel. When the related ID signal is absent from the present channel, the program advances from the step 125 to the step 128 which updates the old data of the present channel. When the related ID signal is present in the present channel, the program advances from the step 125 to the steps 126 and 129 which establish the communication link via the present channel. On the other hand, in respect of channels free from a data change, the old data which are stored in the memory 21 remain unchanged. This process allows a short period of one cycle of the channel scan.

During "m+1"-th cycle of the channel scan, the changes of data in 4-channel, 8-channel, and 11-channel are detected by the step 123, and therefore the program advances from the step 123 to the step 124. The step 124 detects the type of the data change. When the data changes from a channel-occupied state to a channel-open state as in 8-channel, the program advances from the step 124 to the step 127 which updates the old data of the present channel. When the data changes from the channel-open state to the channel-occupied state as in 4-channel and 11-channel, the program advances from the step 124 to the step 125 which discriminates the presence or absence of the related ID signal in or from the present channel. When the related ID signal is absent from the present channel, the program advances from the step 125 to the step 128 which updates the old data of the present channel. When the related ID signal is present in the present channel, the program advances from the step 125 to the steps 126 and 129 which establish the communication link via the present channel. On the other hand, in respect of channels free from a data change, the old data which are stored in the memory 21 remain unchanged. This process allows a short period of one cycle of the channel scan.

Figure 4:
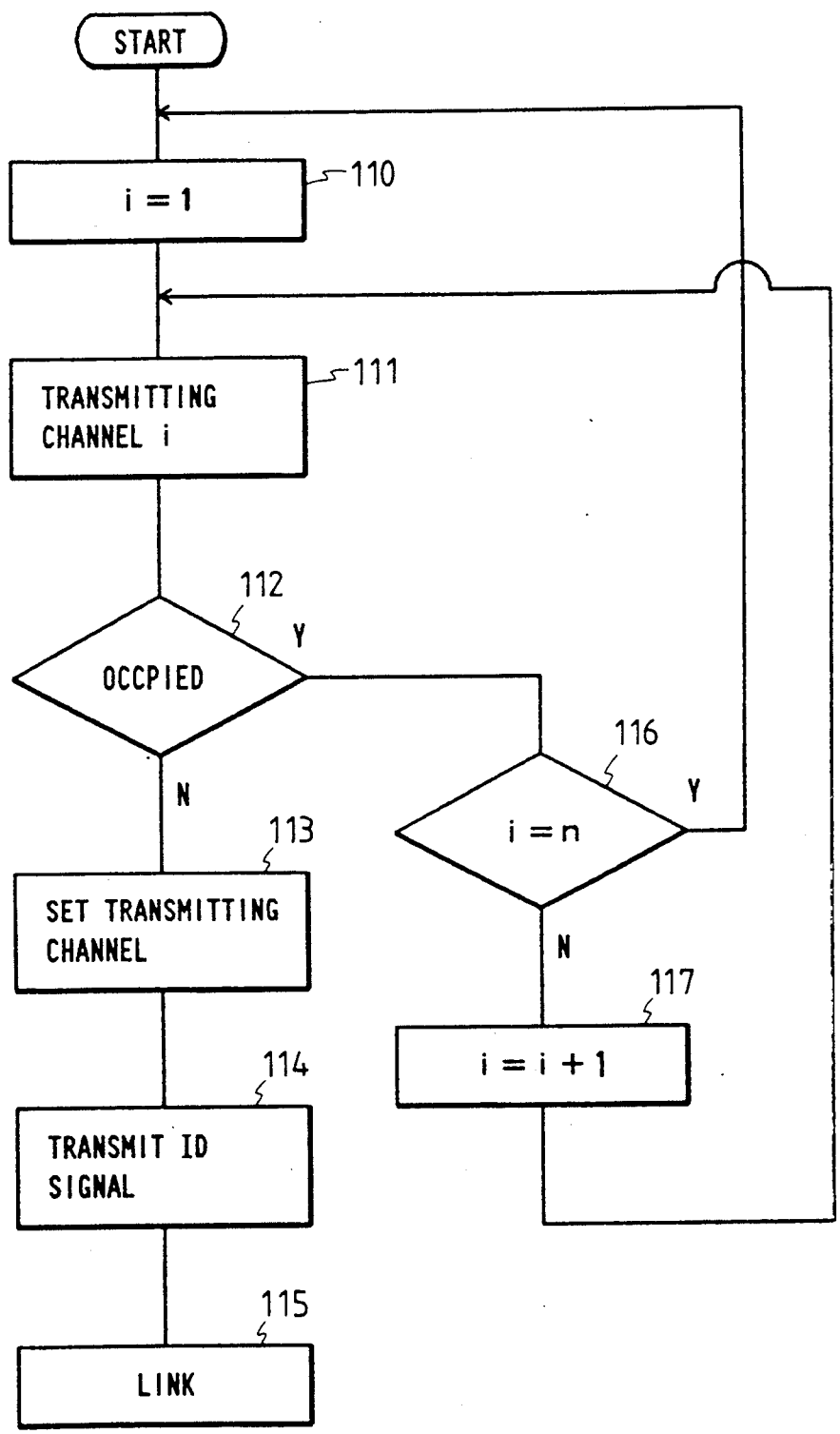
FIG. 4 is a flowchart of another part of the program operating the control circuit of FIG. 1.

FIG. 4 is a flowchart of the part of the program which corresponds to the mode of operation of the transceiver where the tranceiver is required to call another station and to perform communication with that station. This mode of operation of the transceiver will be described hereinafter with reference to FIG. 4. It should be noted that this mode of operation of the transceiver is generally similar to that of a conventional transceiver.

When a transmission switch (not shown) of the transceiver is turned to an ON position, the program starts and advances to a step 110 which sets the variable "i" to "1". The channels are numbered from "1" to "n" and are identified by these numbers. The variable "i" represents a selected or received channel. After the step 110, the program advances to a step 111.

The step 111 controls the local oscillator 10 in accordance with the value "i" to select the channel whose identification number is equal to the value "i". The selected channel is monitored by the receiver section 19 of the transceiver.

A step 112 following the step 111 checks the output signal from the comparator 12. When the output signal from the comparator 12 represents that the strength of the received RF signal exceeds the reference strength, that is, when the output signal from the comparator 12 represents that the present channel is occupied, the program advances to a step 116. When the output signal from the comparator 12 represents that the strength of the received RF signal does not exceed the reference strength, that is, when the output signal from the comparator 12 represents that the present channel is open, the program advances to a step 113.

The step 113 controls the local oscillator 10 so that the frequency of the output signal from the local oscillator 10 is fixed to the current frequency which corresponds to the current channel "i".

A step 114 following the step 113 activates the transmitter section 20 to transmit an ID signal calling another station.

A step 115 following the step 114 establishes communication link.

The step 116 compares the value "i" with a given number "n" which equals the total number of the channels. When the value "i" differs from the given number "n", the program advances to a step 117. When the value "i" equals the given number "n", the program returns to the step 110.

The step 117 increments the channel number "i" by "1" by executing the statement "i=i+1". After the step 117, the program returns to the step 111.

What is claimed is:

1. A radio communication apparatus comprising:
   discriminating means for sequentially scanning a plurality of frequency channels to determine whether or not the frequency channels are open or occupied and generating channel-condition signals representative thereof during each channel scanning cycle, wherein the channel-condition signals correspond to the channels respectively;

holding means for holding the channel-condition signals;

means for detecting a variation between a current channel-condition signal and a preceding channel-condition signal with respect to each of the channels, wherein the current channel-condition signal is currently generated by the discriminating means, and the preceding channel-condition signal is retrieved from the holding means;

means for detecting whether or not a given identification signal is present in the channel where the detected variation occurs;

means for establishing a receiving condition in the channel where the detected variation occurs if the identification signal is present, and means for, in respect of the channel where the detected variation occurs, updating the channel-condition signal in the holding means by the current channel-condition signal.

2. A radio communication apparatus of a multi channel access type, comprising:

means for sequentially scanning a plurality of received channels and for sequentially detecting strengths of electric fields in the received channels respectively and outputting detection signals which correspond to the received channels respectively and which represent the detected strengths respectively;

means for comparing the detection signals with a preset reference signal and generating strength signals which correspond to the received channels respectively and which represent whether or not the respective detection signals are greater than the reference signal;

means for storing the strength signals;

means for detecting a variation between a current strength signal and a preceding strength signal of each of the received channels, to detect a channel in which the variation occurs, and for discriminating whether or not a given identification signal is present in the detected channel, wherein the current strength signal and the preceding strength signal of each of the received channels are fed from the comparing means and the storing means respectively;

means for, when the identification signal is present in the detected channel, establishing a receiving condition in the detected channel; and means for updating the strength signals stored in the means for storing when said means for detecting a variation detects a variation between a current strength signal and a preceding strength signal.

3. The apparatus of claim 1 wherein the variation corresponds to the fact that the detection signal is not greater than the reference signal in respect of the preceding strength signal and the detection signal is greater than the reference signal in respect of the current strength signal.

* * * * *